(12) United States Patent
Abrams

(10) Patent No.: US 7,381,284 B2
(45) Date of Patent: *Jun. 3, 2008

(54) FLOCKED TRANSFER AND ARTICLE OF MANUFACTURE INCLUDING THE APPLICATION OF THE TRANSFER BY THERMOPLASTIC POLYMER FILM

(75) Inventor: Louis Brown Abrams, Larimer, CO (US)

(73) Assignee: High Voltage Graphics, Inc., Fort Collins, CO (US)

( * ) Notice: Subject to any disclaimer, the term of this patent is extended or adjusted under 35 U.S.C. 154(b) by 7 days.

This patent is subject to a terminal disclaimer.

(21) Appl. No.: 10/455,575

(22) Filed: Jun. 4, 2003

(65) Prior Publication Data

US 2003/0186019 A1    Oct. 2, 2003

Related U.S. Application Data

(60) Division of application No. 09/735,721, filed on Dec. 13, 2000, now Pat. No. 7,364,782, which is a continuation-in-part of application No. 09/621,830, filed on Jul. 24, 2000, now Pat. No. 7,344,769.

(51) Int. Cl.
*B29C 65/02* (2006.01)
*B32B 37/05* (2006.01)
*B32B 37/16* (2006.01)
*B32B 38/00* (2006.01)
*B44C 1/165* (2006.01)
*B44C 1/17* (2006.01)

(52) U.S. Cl. .................. 156/155; 156/230; 156/238; 156/240; 156/247; 156/250

(58) Field of Classification Search ............ 156/155, 156/166, 171, 230, 231, 234, 238, 240, 241, 156/247, 250, 256, 289, 307.1, 308.2, 309.6

See application file for complete search history.

(56) References Cited

U.S. PATENT DOCUMENTS

D66,035 S    11/1924    McIntosh .................. D6/593

(Continued)

FOREIGN PATENT DOCUMENTS

AT    E 93 557    8/1988

(Continued)

OTHER PUBLICATIONS

U.S. Appl. No. 09/548,839, filed Apr. 13, 2000, Abrams.

(Continued)

*Primary Examiner*—Philip Tucker
*Assistant Examiner*—Sing P. Chan
(74) *Attorney, Agent, or Firm*—Sheridan Ross P.C.

(57) ABSTRACT

A flocked transfer is produced by applying a release agent to a release sheet, and then applying the flocking to a release agent. Unlike the traditional method, a binder and thermoplastic hot melt film is applied to the back of the flock. The transfer, which is essentially release sheet, is then applied to a substrate, such as item of clothing, a rubber pad, etc., by positioning a sheet of thermoplastic hot melt film on the substrate; placing the transfer on the hot melt with the flock in contact with the hot melt film; and applying heat and pressure. The heat melts the thermoplastic hot melt film to bind the flock to the substrate and binds the flocking together. This method reduces the cost involved in producing flocked articles, especially for articles produced on a continuous basis.

46 Claims, 3 Drawing Sheets

U.S. PATENT DOCUMENTS

| | | | |
|---|---|---|---|
| 1,905,989 A | 4/1933 | Safir et al. ................ 428/189 |
| D108,581 S | 2/1938 | Robinson ................ D6/583 X |
| D114,814 S | 5/1939 | Hoos ........................... D6/593 |
| D122,192 S | 8/1940 | De Moreau ................ D6/593 |
| D125,860 S | 3/1941 | Haas ........................... D6/593 |
| D162,533 S | 3/1951 | Goldfarb ..................... D6/593 |
| 2,592,602 A | 4/1952 | Saks |
| 2,636,837 A | 4/1953 | Summers |
| 2,916,403 A * | 12/1959 | Calderwood ................ 428/379 |
| 2,999,763 A | 9/1961 | Sommer |
| D195,245 S | 5/1963 | Edesess ........................ D6/583 |
| 3,215,584 A | 11/1965 | McConnell et al. |
| 3,314,845 A | 4/1967 | Perri |
| 3,377,232 A | 4/1968 | Mencock et al. |
| 3,459,579 A | 8/1969 | Newman |
| 3,496,054 A | 2/1970 | Baigas |
| 3,529,986 A | 9/1970 | Kappas et al. |
| 3,565,742 A | 2/1971 | Stephens et al. |
| 3,622,434 A * | 11/1971 | Newman .................... 428/179 |
| 3,639,149 A | 2/1972 | Spalding |
| 3,644,267 A | 2/1972 | Jackson, Jr. et al. |
| 3,657,060 A | 4/1972 | Haigh ........................ 161/73 |
| 3,660,200 A * | 5/1972 | Anderson et al. ........... 156/278 |
| 3,674,611 A | 7/1972 | Petry et al. |
| 3,772,132 A | 11/1973 | Dulin, Jr. |
| 3,775,205 A | 11/1973 | Hermann et al. ............. 156/72 |
| 3,793,050 A | 2/1974 | Mumpower, Jr. |
| 3,803,453 A | 4/1974 | Hull |
| 3,816,050 A | 6/1974 | Koskolos .................... 431/350 |
| 3,816,211 A | 6/1974 | Haigh ........................ 156/309 |
| 3,837,946 A | 9/1974 | Gribbin |
| 3,900,676 A | 8/1975 | Alderson |
| 3,903,331 A * | 9/1975 | Klein .......................... 427/206 |
| 3,917,883 A | 11/1975 | Jepson |
| 3,936,554 A | 2/1976 | Squier |
| 3,956,552 A | 5/1976 | Geary |
| 3,961,116 A | 6/1976 | Klein |
| 3,969,559 A | 7/1976 | Boe |
| 3,979,538 A | 9/1976 | Gilman et al. |
| 3,989,869 A | 11/1976 | Neumaier et al. .......... 428/254 |
| 4,018,956 A | 4/1977 | Casey ......................... 428/86 |
| 4,025,678 A | 5/1977 | Frank |
| 4,031,281 A | 6/1977 | Keeling |
| 4,034,134 A | 7/1977 | Gregorian et al. ............. 428/86 |
| 4,035,532 A | 7/1977 | Gregorian et al. ............. 428/90 |
| 4,062,992 A | 12/1977 | Power et al. |
| 4,088,708 A * | 5/1978 | Riew ........................ 525/113 |
| 4,102,562 A | 7/1978 | Harper et al. ................ 350/105 |
| 4,120,713 A | 10/1978 | Jensen et al. ................ 156/72 |
| 4,142,929 A | 3/1979 | Otomine et al. |
| 4,160,851 A | 7/1979 | Lienert et al. ............... 427/379 |
| 4,201,810 A | 5/1980 | Higashiguchi |
| 4,218,501 A | 8/1980 | Kameya et al. |
| 4,269,885 A | 5/1981 | Mahn ......................... 428/216 |
| 4,273,817 A | 6/1981 | Matsuo et al. ................. 428/90 |
| 4,282,278 A | 8/1981 | Higashiguchi ................ 428/90 |
| 4,292,100 A | 9/1981 | Higashiguchi |
| 4,294,641 A | 10/1981 | Reed et al. |
| 4,308,296 A | 12/1981 | Chitouras |
| 4,314,813 A | 2/1982 | Maskai ........................ 8/468 |
| 4,314,955 A | 2/1982 | Boden et al. ................ 264/51 |
| 4,340,623 A | 7/1982 | Justus |
| 4,340,632 A | 7/1982 | Wells et al. |
| 4,352,924 A | 10/1982 | Wooten et al. |
| 4,362,773 A | 12/1982 | Shikinami |
| 4,369,157 A | 1/1983 | Conner ...................... 264/246 |
| 4,370,374 A * | 1/1983 | Raabe et al. ................ 428/216 |
| 4,385,588 A | 5/1983 | Bennetot .................... 118/638 |
| 4,387,214 A | 6/1983 | Passmore et al. |
| 4,388,134 A | 6/1983 | Long et al. ................. 156/248 |
| 4,390,387 A | 6/1983 | Mahn |
| 4,396,662 A | 8/1983 | Higashiguchi |
| 4,405,401 A | 9/1983 | Stahl ......................... 156/248 |
| 4,418,106 A | 11/1983 | Landler et al. |
| 4,423,106 A | 12/1983 | Mahn ......................... 428/207 |
| 4,430,372 A | 2/1984 | Knoke et al. |
| 4,438,533 A | 3/1984 | Hefele |
| 4,446,274 A | 5/1984 | Okazaki et al. |
| 4,465,723 A | 8/1984 | Knoke et al. |
| 4,510,274 A | 4/1985 | Okazaki et al. |
| 4,539,166 A | 9/1985 | Richartz et al. ............. 264/45.1 |
| 4,574,018 A | 3/1986 | Masuda et al. ................ 156/72 |
| 4,582,658 A | 4/1986 | Reichmann et al. ....... 264/45.1 |
| 4,588,629 A | 5/1986 | Taylor |
| 4,610,904 A | 9/1986 | Mahn et al. |
| 4,650,533 A | 3/1987 | Parker et al. |
| 4,652,478 A | 3/1987 | Maii ........................... 428/43 |
| 4,668,323 A | 5/1987 | Lenards et al. ............. 156/242 |
| 4,670,089 A * | 6/1987 | Hanson ........................ 216/35 |
| 4,681,791 A | 7/1987 | Shibahashi et al. ........... 428/96 |
| 4,687,527 A | 8/1987 | Higashiguchi ................ 156/72 |
| 4,741,791 A | 5/1988 | Howard et al. |
| 4,790,306 A | 12/1988 | Braun et al. ........... 128/206.12 |
| 4,793,884 A | 12/1988 | Horikiri ..................... 156/247 |
| 4,797,320 A | 1/1989 | Kopp et al. ............... 428/316.6 |
| 4,810,321 A | 3/1989 | Wank et al. ............. 156/244.23 |
| 4,810,549 A | 3/1989 | Abrams et al. |
| 4,812,247 A | 3/1989 | Fahner et al. ................ 252/511 |
| 4,834,502 A | 5/1989 | Bristol et al. .......... D14/114 X |
| 4,895,748 A | 1/1990 | Squires |
| 4,931,125 A | 6/1990 | Volkmann et al. |
| 4,980,216 A | 12/1990 | Rompp ........................ 428/90 |
| 5,008,130 A | 4/1991 | Lenards ...................... 427/206 |
| 5,009,950 A | 4/1991 | Wagner et al. .............. 428/290 |
| 5,026,591 A | 6/1991 | Henn et al. .................. 428/198 |
| 5,041,104 A | 8/1991 | Seal |
| 5,043,375 A | 8/1991 | Henning et al. ............. 524/372 |
| 5,047,103 A | 9/1991 | Abrams et al. |
| 5,053,179 A | 10/1991 | Masui et al. ................ 264/257 |
| 5,059,452 A | 10/1991 | Squires |
| 5,077,116 A | 12/1991 | Lefkowitz |
| 5,108,530 A | 4/1992 | Niebling, Jr. et al. ........ 156/245 |
| 5,112,423 A | 5/1992 | Liebe, Jr. |
| 5,115,104 A | 5/1992 | Bunyan |
| 5,154,871 A | 10/1992 | Wagner et al. .............. 264/255 |
| 5,198,277 A | 3/1993 | Hamilton et al. .............. 428/92 |
| 5,207,851 A | 5/1993 | Abrams |
| 5,217,563 A | 6/1993 | Niebling et al. ............. 156/382 |
| 5,217,781 A | 6/1993 | Kuipers ....................... 428/85 |
| 5,248,536 A | 9/1993 | Du Katz ...................... 428/40 |
| 5,274,039 A | 12/1993 | Sirinyan et al. ............. 525/130 |
| 5,306,567 A | 4/1994 | Kuo et al. |
| 5,338,603 A | 8/1994 | Mahn et al. |
| 5,346,746 A | 9/1994 | Abrams |
| 5,350,474 A | 9/1994 | Yamane ...................... 156/240 |
| 5,350,830 A | 9/1994 | Kuo et al. |
| 5,358,789 A | 10/1994 | Kuo et al. |
| 5,383,996 A * | 1/1995 | Dressler ..................... 156/234 |
| D365,342 S | 12/1995 | Evenson et al. ............. D14/114 |
| D366,654 S | 1/1996 | Lovegrove et al. ......... D14/114 |
| 5,489,359 A | 2/1996 | Yamane ...................... 156/540 |
| 5,529,650 A | 6/1996 | Bowers et al. |
| 5,534,099 A | 7/1996 | Yamamoto .................. 156/230 |
| 5,564,249 A | 10/1996 | Borys et al. |
| 5,597,637 A | 1/1997 | Abrams et al. |
| 5,622,587 A | 4/1997 | Barthelman ................ 156/251 |
| 5,693,400 A | 12/1997 | Hamilton et al. ............. 428/89 |
| D391,572 S | 3/1998 | Lee |
| 5,762,379 A | 6/1998 | Salmon et al. ................ 283/91 |
| 5,766,397 A | 6/1998 | Jones ........................ 156/230 |
| 5,771,796 A | 6/1998 | Morrison et al. |
| 5,804,007 A | 9/1998 | Asano ........................ 156/72 |
| 5,858,156 A | 1/1999 | Abrams et al. |
| 5,900,096 A | 5/1999 | Zemel ........................ 156/233 |

| | | | |
|---|---|---|---|
| 5,912,065 A | 6/1999 | Kukoff | 428/195 |
| 5,922,436 A | 7/1999 | Banfield et al. | 428/100 |
| 5,981,009 A | 11/1999 | Iacono et al. | 428/40.1 |
| 6,010,764 A | 1/2000 | Abrams | 428/90 |
| 6,083,332 A | 7/2000 | Abrams | |
| 6,102,686 A | 8/2000 | Eschenfelder | 425/388 |
| 6,110,560 A | 8/2000 | Abrams | 428/90 |
| 6,113,149 A | 9/2000 | Dukatz | 283/91 |
| 6,146,485 A | 11/2000 | Iacono et al. | 156/230 |
| 6,170,881 B1 | 1/2001 | Salmon et al. | 283/91 |
| 6,171,678 B1 | 1/2001 | Holeschovsky et al. | 428/97 |
| 6,202,549 B1 | 3/2001 | Mitsam et al. | 101/27 |
| 6,224,707 B1 | 5/2001 | Lion | 156/230 |
| 6,247,215 B1 | 6/2001 | Van Alboom et al. | |
| 6,249,297 B1 | 6/2001 | Lion | 347/717 |
| 6,257,866 B1 | 7/2001 | Fritz et al. | 425/387.1 |
| 6,264,775 B1 | 7/2001 | Holeschovsky et al. | 156/72 |
| 6,277,312 B1 | 8/2001 | Hansen et al. | 264/132 |
| 6,296,908 B1 | 10/2001 | Reihs et al. | 427/393.5 |
| 6,299,715 B1 | 10/2001 | Langsdorf et al. | 156/72 |
| 6,350,504 B1 | 2/2002 | Alboom et al. | |
| 6,376,041 B1 | 4/2002 | Morrison et al. | |
| 6,387,472 B1 | 5/2002 | Reck et al. | 428/195 |
| 6,428,877 B1 | 8/2002 | Suss et al. | 428/195 |
| 6,436,506 B1 | 8/2002 | Pinter et al. | |
| 6,451,148 B1 | 9/2002 | Jenner | 156/230 |
| 6,569,538 B1 | 5/2003 | Kaschel | |
| 6,660,352 B2 | 12/2003 | Hsu et al. | |
| 6,676,796 B2 | 1/2004 | Pinter et al. | |
| 6,887,737 B1 | 5/2005 | Woods et al. | |
| 6,929,771 B1 | 8/2005 | Abrams | |
| 6,977,023 B2 | 12/2005 | Abrams | |
| 7,229,680 B1 | 6/2007 | Crompton | |
| 2001/0008039 A1 | 7/2001 | Alboom et al. | |
| 2001/0008672 A1 | 7/2001 | Norvell et al. | |
| 2002/0009571 A1 | 1/2002 | Abrams | |
| 2002/0098329 A1 | 7/2002 | Abrams | |
| 2003/0129353 A1 | 7/2003 | Abrams | |
| 2003/0186019 A1 | 10/2003 | Abrams | |
| 2003/0207072 A1 | 11/2003 | Abrams | |
| 2003/0211279 A1 | 11/2003 | Abrams | |
| 2004/0050482 A1 | 3/2004 | Abrams | |
| 2004/0053001 A1 | 3/2004 | Abrams | |
| 2004/0055692 A1 | 3/2004 | Abrams | |
| 2004/0058120 A1 | 3/2004 | Abrams | |
| 2004/0081791 A1 | 4/2004 | Abrams | |
| 2004/0170799 A1 | 9/2004 | Carr et al. | |
| 2005/0081985 A1 | 4/2005 | Abrams | |
| 2005/0158508 A1 | 7/2005 | Abrams | |
| 2005/0266204 A1 | 12/2005 | Abrams | |
| 2005/0268407 A1 | 12/2005 | Abrams | |
| 2006/0026778 A1 | 2/2006 | Lion | |
| 2006/0029767 A1 | 2/2006 | Lion | |
| 2006/0251852 A1 | 11/2006 | Abrams | |
| 2007/0003761 A1 | 1/2007 | Miyazono et al. | |
| 2007/0022548 A1 | 2/2007 | Abrams | |
| 2007/0026189 A1 | 2/2007 | Abrams | |

FOREIGN PATENT DOCUMENTS

| | | |
|---|---|---|
| AT | E 135 427 | 8/1996 |
| AU | 606651 | 2/1991 |
| AU | 653994 | 10/1994 |
| BE | 0506601 | 3/1996 |
| CA | 757595 | 4/1967 |
| CA | 2010076 | 8/1990 |
| CA | 1306411 | 8/1992 |
| CA | 2064300 | 9/1992 |
| DE | 3883517 | 5/1994 |
| DE | 69208910 | 8/1996 |
| DE | 019734316A 1 | 2/1999 |
| EP | 0122656 | 10/1984 |
| EP | 351079 A3 | 6/1986 |
| EP | 0 210304 | 2/1987 |
| EP | 0 280 296 | 2/1988 |
| EP | 0506601 A1 | 9/1992 |
| EP | 0685014 | 12/1995 |
| EP | 0506601 | 5/1996 |
| EP | 0913271 A1 | 10/1998 |
| EP | 0 989 227 A2 | 3/2000 |
| FR | 1 480 860 | 5/1967 |
| FR | 2210149 | 7/1974 |
| FR | 2543984 | 10/1984 |
| FR | 2 659 094 | 3/1990 |
| FR | 9002623 | 3/1990 |
| FR | 2784619 | 10/1998 |
| FR | 2846202 | 4/2004 |
| GB | 1171296 | 11/1969 |
| GB | 1466271 | 12/1973 |
| GB | 1 447 049 | 8/1976 |
| GB | 2065031 A | 12/1979 |
| GB | 2126951 A | 9/1983 |
| GB | 2214869 | 9/1989 |
| GB | 0506601 | 9/1992 |
| IE | 55104 | 4/1984 |
| IT | 0329767 | 8/1993 |
| IT | 24637BE/96 | 6/1996 |
| JP | 52-155270 | 12/1977 |
| JP | 54-163934 | 12/1979 |
| JP | 55079143 | 6/1980 |
| JP | 55-147171 | 11/1980 |
| JP | 356058824 A | 5/1981 |
| JP | 56107080 | 8/1981 |
| JP | 56108565 | 8/1981 |
| JP | 56141877 | 11/1981 |
| JP | 58062027 | 4/1983 |
| JP | 359115885 A | 7/1984 |
| JP | 60-171138 | 9/1985 |
| JP | 60-236738 | 11/1985 |
| JP | 63118544 | 5/1988 |
| JP | 64-61299 | 3/1989 |
| JP | 2-25667 | 6/1990 |
| JP | 5-201196 | 8/1993 |
| JP | 05255021 | 10/1993 |
| JP | 08-267625 | 10/1996 |
| JP | 10059790 | 3/1998 |
| JP | 11277662 | 10/1999 |
| JP | 11348159 | 12/1999 |
| JP | 020000084977 | 3/2000 |
| JP | 2001270019 | 10/2001 |
| KR | 220373 | 9/1999 |
| KR | 2003063833 | 7/2003 |
| NO | 306099 | 6/1989 |
| TW | 62640 | 7/1993 |
| WO | WO 79/01146 | 12/1979 |
| WO | W/O 89/01829 | 3/1989 |
| WO | WO 90/09289 | 8/1990 |
| WO | WO 94/19530 | 9/1994 |
| WO | PCT/US01/23195 | 1/2002 |
| WO | WO 02107959 | 1/2002 |
| WO | WO 02/09925 A1 | 2/2002 |
| WO | WO 02/058854 A1 | 8/2002 |
| WO | WO 03/031083 A1 | 4/2003 |
| WO | WO 2004/005023 | 1/2004 |
| WO | WO 2004/005413 | 1/2004 |
| WO | WO 2004/005600 | 1/2004 |
| WO | WO 2005/035235 | 4/2005 |
| WO | WO 2005/118948 | 12/2005 |
| ZA | 88/6259 | 4/1990 |
| ZA | 92/2154 | 2/1993 |

OTHER PUBLICATIONS

U.S. Appl. No. 09/621,830, filed Jul. 24, 2000, Abrams.
U.S. Appl. No. 29/058,551, filed Aug. 19, 1996, Abrams.

Abrams, Brown, "Flocking A Touch of Velour" *ScreenPrinting* (Apr. 1987).
Abrams, Brown, "Part II: Flocking" *ScreenPrinting* (Jun. 1987).
Declaration of L. Brown Abrams Under 37 CFR § 1.98 for U.S. Appl. No. 09/735,721 dated Jan. 16, 2004, 2 pages.
Declaration of L. Brown Abrams under 37 CFR 1.132 for U.S. Appl. No. 09/735,721 dated Jan. 7, 2003, 2 pages.
Bostik Findley USA, "Industrial Adhesives" (2001), 3 pages.
Lextra® MouseRug®; "Dimensions" (Jan. 27, 1999), http://www.mouserug.com/mouserug/dimensions.html, 1 page.
Mouse Escalator; *The only resolution to all your PC mouse problems*; Jan. 27, 1999, 3 pages.
Changpad Trading Inc.; *Heat-Trans Pad*; Jan. 27, 1999, available at http://www.changpad.com.tw/heat-trans.htm, 1 page.
Everglide; *Everglide Mousing Surface & trade*; Jan. 27, 1999, available at http://www.everglide.com/mousing_surface.htm, 1 page.
Artpads; *Catalog*; Jan. 27, 1999, available at http://www.accelerated.com/artpads/default.htm, 2 pages.
Fake Fur Computer Accessories; *Products*; Jan. 27, 1999, available at http://workwares.com.au/products.htm, 3 pages.
Lextra® MouseRug®; *Mouserug Components*; Jan. 27, 1999, available at http://www.mouserug.com/mouserug/mouscom.html, 2 pages.
Lextra® MouseRug®; *About the Product*; Jan. 27, 1999, http://www.mouserug.com/mouserug/aboutmouserugs.html, 2 pages.
The Original PentaPad®; *The Original PentaPad Specs*; Jan. 27, 1999, available at http://penta-pad.com/specs.html, 2 pages.
Casa Nostra Designs; *New York or the Big Apple*; 1997, available at http://apropa.se/newyork.html, 1 page.
Stahls', New Product Bulletin; not dated.
Agion Technologies, LLC., *The Most Advanced Antimicrobial Silver Delivery System*; not dated.
Bayer Plastics Division Press Release, *Wheel Covers, Center Caps Become Revolving Art Forms with New Film Insert Molding Technology*, Jun. 19, 2000.
Shaner, *Advanced Molding Processes: Low Pressure Molding/Low-High Pressure Molding for Interior Trim*, Ken 1997.
Snyder *Fabric Molding Shows Promise in Automotive*, Oct. 1999.
Defosse, *Systems Approach Gives Blow Molders Big Edge*, Dec. 2000.
Takatori, *Dieprest In-mold Laminate Technology*, 1999.
Sonics & Materials, Inc., *Chart II Compatability of Thermoplastics*, not dated.
Declaration of L. Brown Abrams under 37 CFR §1,132, Jan. 15, 2003.
"A Rug Fit for a Mouse," *Time Magazine* (Sep. 28, 1998) p. 96.
"Rugs for Rodents," *Newsweek* (Nov. 9, 1998), p. 8.
"New pads for computer mice now cutting a different rug," *USA Today* (Oct. 26, 1998), p. D1.
"Magic Carpet," *Wired* (Nov. 1998), p. 68.
"When is a mouse pad really a rug?" *The Denver Business Journal* (Nov. 1998), at http://denver.bizjournals.com/denver/stories/1998/11/30/story3.html.
Sears Catalog, Spring/Summer, bath carpets, (B), fringed oblong, pp. 1290-1291, oriental design rugs, A-B, p. 1146, copy in 2000 design library (1978).
JC Penney Catalog, Fall & Winter, accent rugs, A-B, p. 1032, copy in 2000 design library (1991).
Office Action Summary dated Apr. 22, 2005 for U.S. Appl. No. 10/455,541.
First Office Action (with translation) dated Apr. 1, 2005 for Chinese Patent Application No. 01821885.7, 8 pages.
First Office Action dated Oct. 5, 2005 for U.S. Appl. No. 09/735,721, filed Dec. 13, 2000.
Office Action Summary dated Oct. 11, 2005 for U.S. Appl. No. 10/670,091, filed Sep. 23, 2003.
European Search Report, issued Jul. 17, 2006, in European Patent Application No. 01998050.7.
European Search Report, issued Jan. 12, 2006, in European Patent Application No. 01998050.7.
Dec. 30, 2005 Supplemental First Office Action, Chinese Application No. 01814634.1 (English translation provided only).
Oct. 8, 2002 Office Action In Re Application Of Louis Brown Abrams; U.S. Appl. No. 09/621,830, filed Jul. 24, 2000.
Oct. 7, 2005 Office Action In Re Application Of Louis Brown Abrams; U.S. Appl. No. 09/621,830, filed Jul. 24, 2000.
Oct. 8, 2002 Office Action In Re Application Of Louis Brown Abrams; U.S. Appl. No. 09/735,721, filed Dec. 13, 2000.
Mar. 13, 2006 Office Action In Re Application Of Louis Brown Abrams; U.S. Appl. No. 09/735,721, filed Dec. 13, 2000.
Oct. 27, 2005 Office Action In Re Application Of Louis Brown Abrams; U.S. Appl. No. 10/455,541, filed Jun. 4, 2003.
Apr. 5, 2006 Office Action In Re Application Of Louis Brown Abrams; U.S. Appl. No. 10/455,541, filed Jun. 4, 2003.
U.S. Appl. No. 11/460,493, filed Jul. 27, 2006.
U.S. Appl. No. 11/533,699, filed Sep. 20, 2006.
U.S. Appl. No. 11/560,679, filed Nov. 16, 2006.
U.S. Appl. No. 11/565,974, filed Dec. 1, 2006.
U.S. Appl. No. 11/460,493, Abrams.
U.S. Appl. No. 11/533,699, Abrams.
U.S. Appl. No. 11/560,679, Abrams.
U.S. Appl. No. 11/565,974, Abrams.
"Flockin' to Precision"; Images Magazine; Feb. 1992, 1 page.
"RMIUG Meeting Minutes—Colorado in the Information Age"; Jan. 14, 1997; 1 page.
Artisyn Synthetic Paper 165, Printability Product Specification Sheet, Mar. 1999, 2 pages.
Artisyn Synthetic Paper 165, Printability Product Specification Sheet, May 1997, 1 page.
Bostik USA; Web & Powder Adhesives; 2000; 2 pgs.
Cellusuede Products, Inc, "About Flock", Available at http://www.cellusuede.com/navabout.html, KMK Media Group, copyright 2000, 1 pages.
Cellusuede Products, Inc, "FAQ's", Available at http://www.cellusuede.com/faq.html, KMK Media Group, copyright 2000, 2 pages.
Cellusuede Products, Inc, "Fiber Types", Available at http://www.cellusuede.com/about/types.html, KMK Media Group, copyright 2000, 4 pages.
Cellusuede Products, Inc, "Glossary of Terms", Available at http://www.cellusuede.com/glossary/index.html, KMK Media Group, copyright 2000, 2 pages.
Cellusuede Products, Inc, "Uses for Flock, Home Furnishings", Available at http://www.cellusuede.com/home.html, KMK Media Group, copyright 2000, 2 pages.
Computer Current (Nov. 9, 1998).
Examiner's First Report on Australian Patent Application No. 2001280771, mailed Jun. 3, 2005.
Examiner's First Report on Australian Patent Application No. 2002249810, mailed Oct. 20, 2005.
Examiner's Report No. 2 on Australian Patent Application No. 2001280771, mailed Jun. 2, 2006.
International Preliminary Examination Report for International Application No. PCT/US01/23195, mailed Jun. 20, 2002.
International Preliminary Examination Report for PCT/US01/48615, mailed Nov. 14, 2003.
International Search Report for International Application No. PCT/US01/23195, mailed Oct. 30, 2001.
International Search Report for International Application No. PCT/US01/48615, mailed Jun. 17, 2002.
Office Action, Chinese Application No. 01814634.1 from Dec. 30, 2005 (English translation provided).
Official Action for U.S. Appl. No. 09/621,830, mailed Jun. 29, 2006.
Official Action for U.S. Appl. No. 09/621,830, mailed Nov. 15, 2006.
Official Action for U.S. Appl. No. 09/735,721, mailed Nov. 15, 2006.
Official Action for U.S. Appl. No. 10/455,541, mailed Jan. 11, 2007.
Official Action for U.S. Appl. No. 10/670,091, mailed Feb. 20, 2007.
Official Action for U.S. Appl. No. 10/670,091, mailed Jun. 16, 2006.
Official Action for U.S. Appl. No. 10/670,091, mailed Nov. 2, 2006.
Examiner's Report for Canadian Patent Application No. 2,415,680, mailed Apr. 17, 2007.

Invitation pursuant to Article 96(2) and Rule 51(2) EPC, dated Jun. 26, 2007, in European Patent Application No. 01998050.7.

Rejection Decision for Chinese Application No. 01814634.1, issued Apr. 6, 2007.

"Bicomponent Fibers", available at http://web.utk.edu/~mse/pages/Textiles/Bicomponent%20fibers.htm, Updated Apr. 2004, 8 pages.

Official Action for U.S. Appl. No. 09/621,830, mailed May 16, 2007.

Official Action for U.S. Appl. No. 09/735,721, mailed May 16, 2007.

Official Action for U.S. Appl. No. 10/455,541, mailed Jun. 25, 2007.

Official Action for U.S. Appl. No. 10/670,091, mailed Oct. 15, 2007.

Notice of Allowance for U.S. Appl. No. 09/621,830, mailed Oct. 2, 2007.

Notice of Allowance for U.S. Appl. No. 09/735,721, mailed Dec. 12, 2007.

Notice of Allowance for U.S. Appl. No. 10/670,091, mailed Feb. 22, 2008.

Notice of Allowance for U.S. Appl. No. 10/455,541, mailed Jan. 15, 2008.

JP Office Action for 2002-559179, dated Mar. 25, 2008, no translation available.

\* cited by examiner

FLOCKED TRANSFER AND ARTICLE OF MANUFACTURE INCLUDING THE APPLICATION OF THE TRANSFER BY THERMOPLASTIC POLYMER FILM

CROSS-REFERENCE TO RELATED APPLICATION

The present application is a divisional patent application of U.S. patent application Ser. No. 09/735,721, filed Dec. 13, 2000 of the same title, which is a continuation-in-part patent application of U.S. patent application Ser. No. 09/621,830, filed Jul. 24, 2000 entitled "FLOCKED TRANSFER AND ARTICLE OF MANUFACTURE INCLUDING THE FLOCKED TRANSFER", each of which is incorporated in its entirety by this reference.

STATEMENT REGARDING FEDERALLY SPONSORED RESEARCH DEVELOPMENT

N/A

BACKGROUND OF THE INVENTION

This invention relates to flocked transfers, and, in particular to an improved method incorporating thermoplastic polymer film, in the making of the flocked transfer, which can reduce the cost and time required of producing transfers by a significant amount.

Heretofore, flocked transfers have generally been produced by applying a release agent to a release sheet. The flocking is applied to the release sheet in the desired pattern. A binder and a permanent hot melt adhesive are applied to the back of the flocking, and the transfer is allowed to dry. The binder is required to hold the flocking in the desired pattern. The hot melt adhesive, which is applied to the transfer as a powder, is used to adhere the transfer to a substrate, such as an article of clothing, a rubber pad, etc. The transfer is applied to the substrate by placing the transfer on the substrate with the dried hot melt adhesive in contact with the substrate. Heat, such as from an iron, is then applied to the release sheet. The heat melts the hot melt adhesive, to cause hot melt adhesive to flow into intimate contact with the substrate, forming a mechanical or physical adhesion with the substrate. The release agent then allows the release sheet to be removed from the transfer, leaving the flocking exposed on the substrate.

This traditional method has worked well for years. However, the method can be improved upon to reduce the cost of producing the transfer, and hence, the cost of the item containing the transfer.

In my co-pending application, I have described the usage of a thermoset film in lieu of the bond and powder for adhesion, which film, when subject to heat, adheres to the substrate, functions as an inherence for the flock. This current invention adds further enhancements to this process, by allowing the application and usage of a thermoplastic film, for adherence of the flock transfer.

BRIEF SUMMARY OF THE INVENTION

In accordance with the invention, generally stated, a flocked transfer of the present invention is produced by applying a release agent to a release sheet, and then applying the flocking to the release agent. Unlike the traditional method, a binder and adhesive are not applied to the ends of the flock, but rather, a thermoplastic polymer film is used in lieu thereof.

To form an article of manufacture with the flocked transfer, a hot melt film (in the form of a sheet are cut to shape) is positioned on the substrate to which the transfer is to be applied. The hot melt is preferably a blank or blank film, but can be any thermoplastic type of polymer film. The flock with the release adhesive and release sheet (i.e., the transfer) is then placed on the sheet of hot melt film with the release sheet up, so that the flocking is in contact with the hot melt film. Heat is then applied to the transfer. The heat melts the hot melt film, and secures the flock to the substrate. Because the film is thermoplastic, even if it is subsequently subjected to heat, below a particular temperature, it will not remelt, nor become tacky, and hence, there is no risk of the fibers becoming matted down in any of this type of adhesive, which could otherwise ruin the plush pile effect. It is known that there is a enhanced adhesion with thermoplastic materials, because the thermoplastic materials will cross-attach, and thereby adhere the flock fibers to it, which may become chemically attached thereto. Through the usage of this invention, the finished flock surface is more plush, soft, because more of the fiber is exposed and extends upwardly out of the adhesive, than with the screen-printed latex, as currently used. Also, this affords better soil release during washing or cleaning because of less fiber/adhesive entanglement occurs with the flock, during application.

The use of a thermoplastic type of film for achieving adherence of a transfer to a surface, can be done either before or after the heat transferring operation, or where the heat transfer is produced. The thermoplastic film can be brought into the process at either stage, with respect to the manufacture of the transfer. It is most practical to combine the hot melt film before the heat transfer is fabricated, so it is combined in a convenient and portable manner, which operation was not possible with the previous type of application, for the thermoset film, because once the thermoset film was heated, it sets, and cannot be reheated.

In addition, it is possible to use a two-part thermoplastic type of film, such as commonly available in the industry, having different properties on each side in terms of, for example, melting point, and viscosity of structure. In this way, one can use a higher melting point hot melt film, of thermoplastic material, on the side that attaches to the flock fibers, so that the transfer is initially put together with higher heat in order to set the fibers in place, and then subsequently during application of the transfer to a textile, it may be done at a lower temperature to activate the hot melt on the substrate side while not hot enough to remelt the film holding the flock in place. Also, the hot melt holding the flock can be a very high viscosity, that is, it will not flow much when melted, in order to keep the fibers in place and not mat them together, while the film on the substrate side could be a lower viscosity type of film, that will readily flow so it will penetrate and establish a good mechanical adhesion of the transfer or grid to any substrate upon which the transfer is applied.

Thus, it is an object of this invention to provide for the development of a flock, that may be temporarily adhered onto a release film carrier, fabricated of a thermoplastic film. And, it is a further object that the hot melt film may be used as an intermediate layer, to attach the fibers to the substrate, when developing the transfer initially.

BRIEF DESCRIPTION OF THE SEVERAL VIEWS OF THE DRAWINGS

Corresponding reference numerals will used throughout the several views of the drawings.

DESCRIPTION OF THE PREFERRED EMBODIMENT

The following detailed description illustrates the invention by way of example, and not by way of limitation. This description will enable one skilled in the art to make and use the invention, including what is presently believed is the best mode of carrying out the invention.

Figure 1:
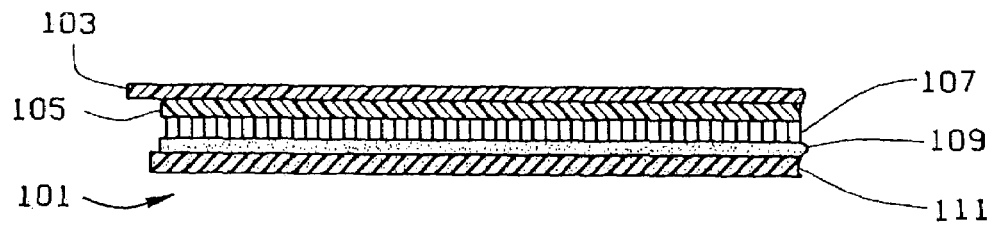
FIG. 1 is a cross-sectional view of a prior art flock transfer.

A prior art flock transfer 101 is shown in FIG. 1. As is known, such transfers include a dimensionally stable release sheet 103, to which a conventional flock transfer release adhesive 105 is applied in a pattern which corresponds to the overall image to be flocked. The flock 107 is then electrostatically coated to the release sheet 105. A binder adhesive 109 is applied to the exposed ends of the flock to bind the flock together as a unit. Lastly, a hot melt adhesive 111 is applied. The transfer is then allowed to dry. The transfer is applied to a substrate, as is known, by positioning the transfer on a substrate, such as a shirt, coat, or other item of clothing, with the hot melt adhesive in contact with the substrate, and applying to the transfer. The heat activates the hot melt adhesive to adhere the transfer to the substrate. This process is described in my prior patent, U.S. Pat. No. 4,810,549, as well as in my co-pending application, Ser. No. 09/548,839, filed Apr. 13, 2000, both of which are incorporated herein by reference.

In addition, I have described a similar transfer to that of this current invention, utilizing a thermosetting film, in my application having Ser. No. 09/621,830, filed on Jul. 24, 2000. The contents of that application are incorporated herein by reference.

Figure 2:
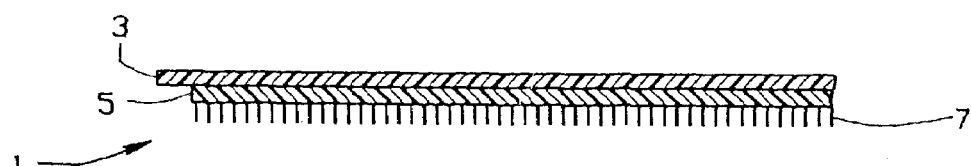
FIG. 2 is a cross-sectional view of a flock transfer of the present invention.
Figure 4:
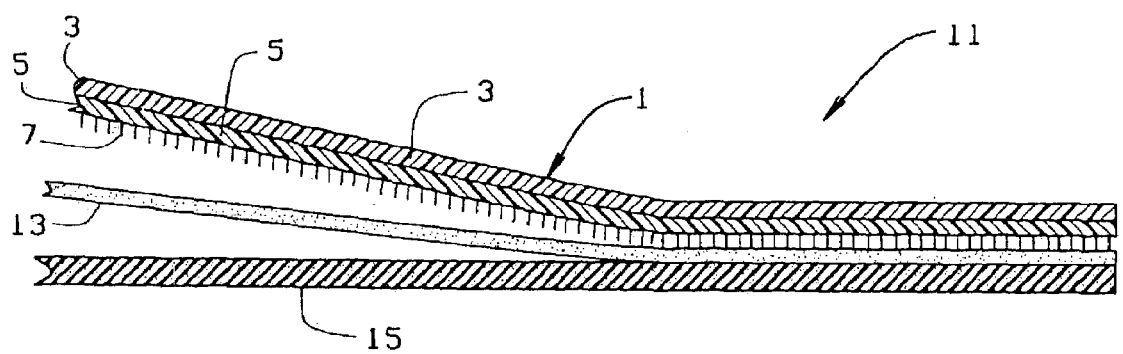
FIG. 4 is a cross-sectional view of an article of manufacture using the transfer of the present invention, showing a part of the transfer applied to part of the substrate and a part of the transfer and hot melt film spaced from the substrate.

A flocked transfer 1 of the present invention is shown in FIG. 2. The transfer 1 of the present invention includes a release sheet 3, to which a conventional release agent 5, such as a wax, or other binder, has been applied. The release agent is applied to the sheet in the shape of a pattern of the flocking. Flocking 7 is then applied to the release agent, and hence, to the release sheet, to form the transfer. The flocking 7 is applied, for example, in the manner as described in my previous patent and applications, which are incorporated herein by reference. Unlike the prior art processes, the transfer 1 is made without the use of a binder adhesive or hot melt adhesive. As is discussed below, a thermoplastic film is used to adhere the transfer to a substrate.

An article of manufacture, such as an item of clothing having a transfer 1 applied thereto, a mouse pad, coaster, or any numerous items having a flocked surface, can be manufactured in accordance with this invention and is easily produced using the transfer 1. Referring to FIGS. 2-5, the article of manufacture 11 is produced by positioning a hot melt sheet 13 between a substrate 15 and the flocked release sheet. The hot melt sheet is, for example, a sheet of thermosetting polyester, available from Bostik, Inc. The hot melt sheet can also be made from a thermoplastic polymer, comprising polyesters, and which is available from Bostik. The hot melt sheet can also be made from a thermoplastic polyurethane. Any other thermoplastic film should also work well. The substrate 15 can be an item of clothing, a rubber pad (as for example, for producing a mouse pad or coaster), etc. The hot melt sheet can be precut to correspond to the shape of the transfer. The transfer 1 is then positioned on the hot melt sheet with the flock 7 against the hot melt sheet 13. Heat is applied to the transfer through the release sheet to activate the hot melt sheet. The hot melt sheet then acts to both bind the flock 7 together and to generally permanently adhere the flock 7 to the substrate 15. Preferably, to assemble the article, the flocked release sheet, the thermoplastic film, and the substrate are brought together and passed through a heat-laminating press where the three parts are subject to temperature of about 300° F. to about 350° F. (about 150° C.) and pressure (about 40-50 psi) for about 30 seconds. It has been found that medium-to-firm pressure has been most advantageous in providing for assembly of this type of plush flocked transfer. The pressure and heat will cause the hot melt film to adhere to the flock and the substrate. Additionally, the hot melt film will physically adhere or cure, to give a strong attachment of the flock to the substrate.

The basic premise of this application in utilizing a thermoplastic film which will semi-cure, after heat has been used to apply the transfer to a substrate, is that after heat application, if the temperature of the transfer does not rise to a particular heat level, it should not remelt again. In other words, the object is to use a hot melt film which has a melting point significantly high enough, so that when the transfer is applied through heat, it will adhere to the substrate, but that when the transfer and the substrate to which it is applied is not exposed to excessive heat, it will not remelt, even through the polymer film is thermoplastic, and for all practical purposes, in actual usage, the film will not remelt since it does not see those high temperatures again. In other words, if the melting point of the thermoplastic film is 350° F., and the top temperature that the flocked finished product will encounter, for example sunlight in a hot car, is only 250° F., then there is not a problem associated with the fact that the film is a thermoplastic and therefore can theoretically melt again, but only if it encounters those excessive temperatures.

Another attribute of the use of a thermoplastic film is that in the event one desires to remove the flocked transfer from, for example, an item of clothing, subjecting the transfer to those elevated temperatures, again, will allow the flock to be removed, if that is a need of the owner.

Figure 3:
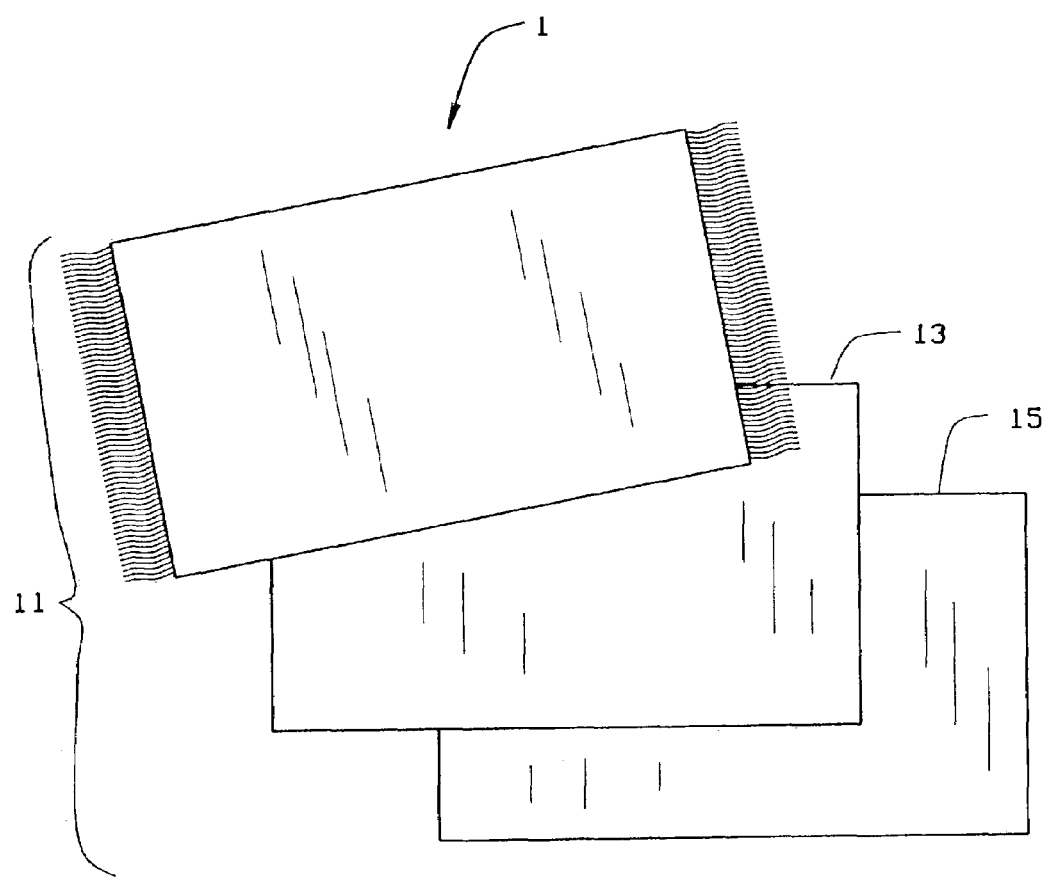
FIG. 3 is an exploded view of the transfer, a hot melt sheet, and a substrate used to make an article of manufacture.
Figure 5:
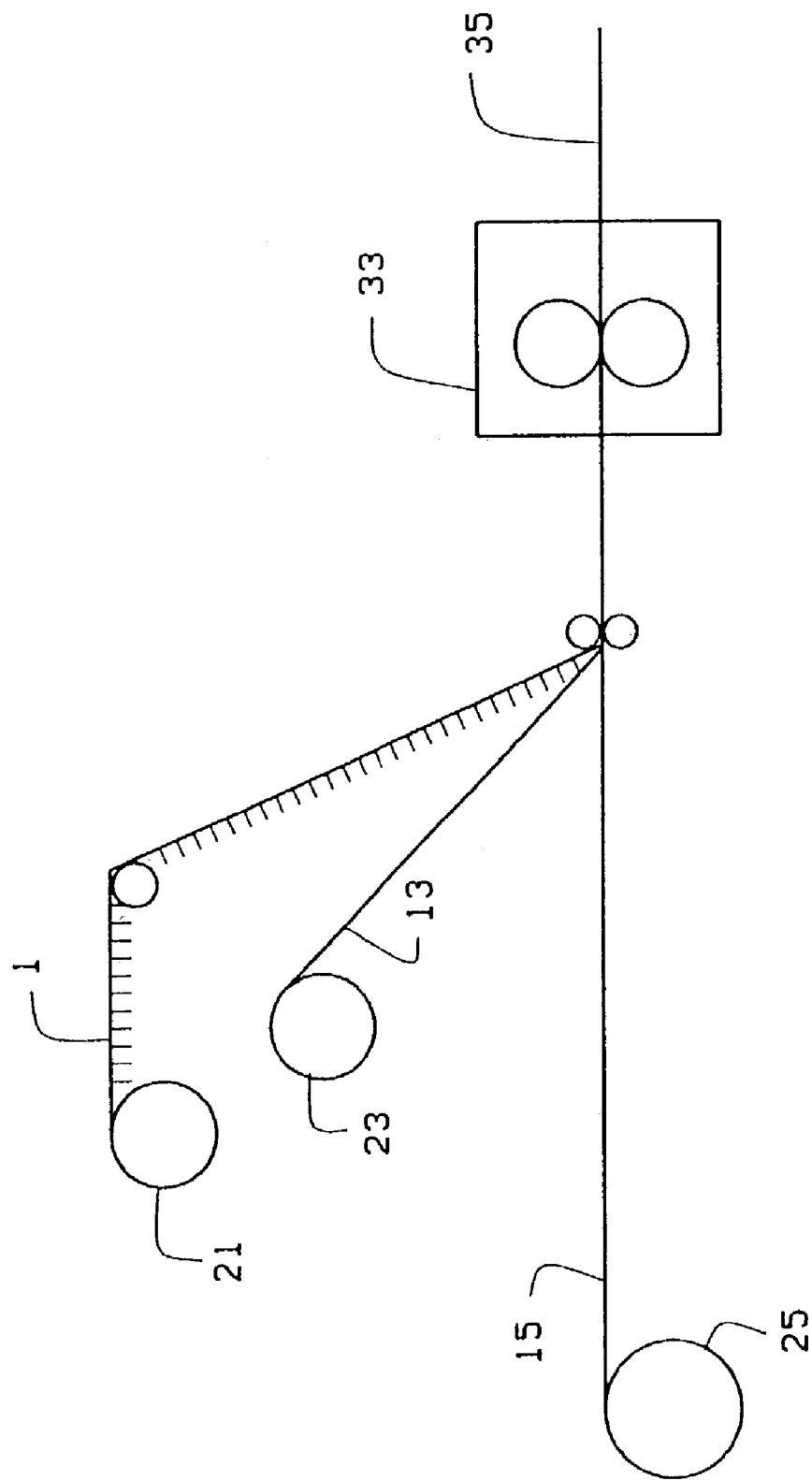
FIG. 5 is a schematic drawing of a process for continuously producing articles of manufacture, such as mouse pads, coasters, transfers for application to clothing, etc.

Articles, such as mouse pads or coasters, in which the entire top surface of the article is covered with the flocking can be produced on a continuous basis, as shown in FIGS. 3 and 5. Rolls 21, 23, and 25 of a flocked release sheet 1, the thermoplastic hot melt film 13, and the substrate 15, are provided. The three parts are brought together at a lamination station 33. Rollers can be provided in front of the station 33 so that the three elements are adjacent each other as they enter the lamination station. Rollers can be provided in front of the station 33 so that the three elements are adjacent as they enter the lamination station. In the lamination station, heat and pressure are applied to the three sheets (the flocked release sheet, the hot melt film, and the substrate) to melt the hot melt film. The melted hot melt film will then cure or cross-link, as noted above, to adhere the flock to the substrate. A web 35 exits the laminating station. The web 35 is then allowed to cool. The web 35 is ultimately directed to a cutting station where it is cut into individual articles. Once the web 35 is cooled, it can be directed immediately to a cutting station (after the sheet 35 cools), or can it can be wound up on an uptake roller to be cut into individual articles at a later time, or at a different location. At the cutting station, the release sheet 3 is removed from the flock and gathered on a take-up roll or is otherwise disposed of. After the release sheet has been removed from the flock, the substrate with the flock adhered thereto is cut to form the articles 11. It is also likely that one could remove the release liner either before or after the die cutting procedure. As shown in FIG. 3, a fringe material 50 can be applied to peripheral edges of the flocked release sheet 1 or substrate 15 during this manufacturing process.

Preferably the release sheet is flocked and supplied in roll form as shown in FIG. 5. However, the flocking of the release sheet could be made part of the process.

To produce flocked articles, such as shirts, jackets, sports bags, etc., which cannot be easily flocked on a continuous basis, the hot melt sheet can be applied to the transfer 1 prior to applying the transfer to the substrate. To do this, the thermoplastic hot melt film is placed in contact with the flock of the transfer, and the transfer and release sheet are heated to a temperature at which the thermoplastic hot melt film becomes tacky, but below the temperature at which the thermoplastic hot melt film begins to cure or physically adhere. This will adhere the thermoplastic hot melt film to the transfer 1 to form a transfer which can later be applied to an article by positioning the transfer with the hot melt film in position on the article (i.e., a piece of clothing) and applying heat and pressure to the transfer, for example, with an iron, sufficient to melt the hot melt film, to cause the hot melt film to somewhat cure or physically adhere, to adhere the flock, and secure to the clothing.

The method eliminates two steps from the prior art method: (1). Application of the binder adhesive, and (2) application, cleaning, sintering, and drying of the hot melt adhesive. In a continuous process, the present method also eliminates a station for applying the binder of hot melt adhesives as well as a station for drying the completed transfer. Because the station is not needed to apply (i.e., print) the binder and hot melt adhesives are applied to the flocking as part of the transfer, the machinery required to produce the article 11 is much less expensive (both in actual cost and in maintenance cost). Additionally, because the binder adhesive and hot melt adhesive is not used, the cost of the article of manufacture is reasonably reduced.

It is conceivable in the performance of the manufacture of the transfer of this invention, that the thermoplastic film may be a dual laminated type of film. For example, the upper surface may include a polyester type of film, that may have a melting point at a higher temperature. The lower film, laminated thereto, may be a polyethylene type of film, designed to have a lower temperature melting point. Hence, when the flock is applied to the upper surface of the laminated film, it will embed slightly into that film when heated, and the flock is electrostatically or otherwise applied, and while the bottom surface of the laminated film may likewise soften, once the transfer is cooled, all the films will become structurally sound, once again, in a film structure. Then, when a lower heat is applied to the transfer, for application of the transfer to a textile, rubber, or other surface, as when the transfer is being applied, the bottom polyethylene or EVA film will slightly soften, or melt, to function as an adhesive, for application of the entire transfer to its supporting substrate or surface. This is an example as to how the thermoplastic film(s) of this invention can be used not only for constructing of the transfer, but to function in a dual manner to allow for the application of the transfer to a shirt, bag, or other material, during its final application.

Another one of the advantages of utilization of thermoplastics, in the fabrication of flocked transfers, is that the binder adhesives previously used in the flocking process, typically contain an acrylic, or other materials, which may be flammable. Thermoplastics avoid that predicament. Furthermore, the thermoplastic type binder exhibits wash fastness, and will hold the flock in place even during severe washing conditions. Furthermore, thermoplastic films exhibit better elasticity, than can be obtained from the thermoset or other binder hot melt systems now in use. In addition, the use of the film provides a thinner profile for the finished product, providing a less bulky type of flock transfer, both visually and structural wise, when applied to a garment or other textiles. For example, flock transfers made in accordance with this invention can even be used upon sheer garment textiles. The usage of the thermoplastic film of this invention, avoids the necessity for application of binders, as previously used, and which contain formaldehyde or other undesirable chemicals, as used in previous adhesives to achieve cross linking for flocking purposes in the prior art. There are other miscellaneous film properties that are enhanced through the usage of thermoplastic films, versus the usage of the binder-hot melt powder combination, because there are films that have performance characteristics that cannot be obtained nor are they available for the binder-powder systems. For example, adhesions to leather, or other tough-to-stick-to-surfaces, that exhibit greater tensile strength, such as stretching that will not split, can be better accommodated through the usage of thermoplastic film.

Variations or modifications to the subject matter of this invention may occur to those skilled in the art upon reviewing the invention as described herein. Such variations, if within the scope of this invention, are intended to be encompassed within the claims to issue upon the invention of this application. The description of the preferred embodiment, as shown in the drawings, is set forth for illustrative purposes only.

The invention claimed is:

1. A method of producing a flocked transfer comprising:
   (a) supplying a flocked release sheet comprising a release sheet, a release adhesive adhered to the release sheet, and a plurality of flock fibers, with the flock fibers being adhered to the release sheet by the release adhesive;
   (b) supplying a pre-formed, solid, and self-supporting thermoplastic adhesive sheet;
   (c) thereafter contacting the flocked release sheet with the pre-formed, solid, and self-supporting thermoplastic adhesive sheet, with the flock fibers being substantially perpendicular to an adjacent surface of the thermoplastic adhesive sheet and the flock being positioned between the release sheet and release adhesive on the one hand and the thermoplastic adhesive sheet on the other; and
   (d) while the flocked release sheet is in contact with the thermoplastic adhesive sheet, heating and applying pressure to the pre-formed, solid, and self-supporting thermoplastic sheet to soften the thermoplastic adhesive and embed ends of the flock fibers in the thermoplastic adhesive sheet, thereby adhering the thermoplastic adhesive sheet to the flock of the flocked release sheet.

2. The method of claim 1, wherein the step of heating the thermoplastic adhesive sheet comprises heating the thermoplastic adhesive sheet to a temperature at which the thermoplastic adhesive sheet becomes tacky, but below a temperature at which the thermoplastic adhesive sheet begins to soften or physically adhere and wherein the thermoplastic adhesive sheet is later adhered to a substrate.

3. The method of claim 1, wherein the step of heating the thermoplastic adhesive sheet comprises heating the thermoplastic adhesive sheet to a temperature at which the thermoplastic adhesive sheet softens and wherein the thermoplastic adhesive sheet is in contact with a substrate during heating and is adhered permanently to the substrate after heating.

4. The method of claim 3 wherein the thermoplastic adhesive sheet has upper and lower portions, wherein the upper portion is contacted with the substrate, wherein the lower portion is contacted with the flock and is positioned between the flock and upper portion, and wherein at least one of the melting point and viscosity of the upper portion is higher than the at least one of the melting point and viscosity of the lower portion.

5. The method of claim 4, wherein the upper portion has a higher melting point than the lower portion.

6. The method of claim 1, wherein the thermoplastic adhesive sheet is at least one of a thermoplastic polyurethane blank and a thermoplastic polyester blank having a substantially uniform thickness.

7. The method of claim 1, wherein at least most of the flock is in direct contact with the thermoplastic adhesive sheet.

8. The method of claim 1, wherein there is no binder adhesive in contact with the thermoplastic adhesive sheet.

9. The method of claim 1, wherein the release sheet and thermoplastic adhesive sheet are on opposing surfaces of the flock.

10. The method of claim 1, wherein the heating step is performed substantially in the absence of a binder adhesive positioned between the thermoplastic adhesive sheet and the flock.

11. The method of claim 1, wherein, after step (d), an embedded length of a flock fiber is positioned in the adhesive and wherein, for most of the flock fibers, the embedded flock length used for the thermoplastic adhesive sheet is less than the embedded flock length used for a screen printed latex.

12. The method of claim 1, further comprising:
before step (d), precutting the thermoplastic adhesive sheet to a desired shape of a transfer formed in step (d).

13. The method of claim 1, further comprising thereafter adhering the thermoplastic adhesive sheet to a substrate to adhere the flock to the substrate.

14. The method of claim 13, wherein the step of heating the thermoplastic adhesive sheet and the step of adhering the thermoplastic adhesive sheet to the substrate are performed substantially simultaneously in a single operation.

15. The method of claim 13, further including, before step (d), a step of cutting the thermoplastic adhesive sheet to a desired shape.

16. The method of claim 12, wherein the interface between the thermoplastic adhesive sheet and the substrate is at least substantially free of a binder adhesive.

17. The method of claim 1, wherein the flock comprises a plurality of fibers substantially perpendicular to the release sheet, and wherein at least substantially all of the flock fibers that are substantially perpendicular to the release sheet contact the thermoplastic adhesive sheet.

18. The method of claim 1, in step (d), the pressure ranges from about 40 to about 50 psi.

19. The method of claim 1, wherein the thermoplastic adhesive, after step (d), is free of a powdered hot melt adhesive.

20. A method for continuously producing an article of manufacture having a flocked surface, the method comprising:
(a) providing a flocked release sheet comprising a release sheet on the release sheet and a release agent and a plurality of flock fibers attached to the release agent, wherein the flock fibers are formed in a desired pattern on the release sheet and are substantially perpendicular to the release sheet;
(b) providing a pre-formed, solid, and self-supporting thermoplastic adhesive sheet;
(c) providing a substrate;
(d) thereafter contacting the substrate, thermoplastic adhesive sheet, and flocked release sheet together, with the thermoplastic adhesive sheet being positioned between the flocked release sheet and the substrate and a free surface of the flock being in contact with the thermoplastic adhesive sheet, to produce a pre-assembly, wherein at least substantially all of the flock fibers that are substantially perpendicular to the release sheet contact the thermoplastic adhesive sheet; and
(e) heating while applying pressure to the pre-assembly to tackify the thermoplastic adhesive and thereby adhere the free surface of the flock and the substrate to the thermoplastic adhesive sheet to form an article of manufacture, wherein at least substantially all of the flock fibers are embedded in the thermoplastic adhesive sheet.

21. The method of claim 20, wherein the thermoplastic adhesive sheet has a substantially uniform thickness.

22. The method of claim 20, wherein the thermoplastic adhesive sheet is a thermoplastic polyester and/or a thermoplastic polyurethane.

23. The method of claim 20, wherein at least most of the flock fibers are in direct contact with the thermoplastic adhesive sheet.

24. The method of claim 20, wherein there is no binder adhesive required to be in contact with the thermoplastic adhesive sheet.

25. The method of claim 20, wherein the release sheet and thermoplastic adhesive sheet are on opposing surfaces of the flock.

26. The method of claim 20, further comprising: applying heat to
the pre-assembly to adhere the flock to the substrate; and
removing the release sheet from the flock to produce a flocked substrate.

27. The method of claim 20, wherein the thermoplastic adhesive sheet comprises upper and low portions, the upper portion being in contact with the flock, and wherein at least one of the following statements is true:
(i) the upper portion has a higher melting point than the lower portion; and
(ii) when melted, the upper portion has a higher viscosity than the lower portion.

28. The method of 20, wherein the pressure applied to the pre-assembly ranges from about 40 to about 50 psi.

29. The method of claim 20, wherein the article of manufacture is free of a powdered hot melt adhesive.

30. A method for forming a transfer, comprising:
(a) forming a flocked release sheet, the flocked release sheet comprising a release sheet, flock fibers, and a release agent positioned between the release sheet and flock, wherein the release agent adheres the flock to the release sheet;

(b) contacting a pre-formed, solid, and self-supporting thermoplastic adhesive sheet to the exposed ends of the flock of the flocked release sheet, wherein the thermoplastic adhesive sheet is formed before step (b); and (c) while the thermoplastic adhesive sheet is in contact with the flock, heating and applying pressure to the flocked release sheet and thermoplastic adhesive sheet to render the thermoplastic adhesive sheet tacky and embed ends of the flock fibers in the thermoplastic adhesive sheet, thereby adhering the flocked release sheet to the thermoplastic adhesive sheet and providing a transfer comprising the thermoplastic adhesive sheet and flocked release sheet.

31. The method of claim 30, wherein step (c) is performed substantially in the absence of a binder adhesive positioned between the thermoplastic adhesive sheet and the flock and wherein the thermoplastic adhesive sheet has a substantially uniform thickness before and after steps (b) and (c).

32. The method of claim 30, further comprising:
(d) thereafter contacting the thermoplastic adhesive sheet with a substrate; and
(e) while the thermoplastic adhesive sheet is contacted with the substrate, heating and applying pressure to the transfer to adhere the transfer to the substrate, wherein, in the contacting step (d), the interface between the thermoplastic adhesive sheet and the substrate is at least substantially free of a binder adhesive.

33. The method of claim 32, wherein, after step (c), an embedded length of a flock fiber is positioned in the thermoplastic adhesive sheet and wherein, for most of the flock fibers, the embedded flock length used for the thermoplastic adhesive sheet is less than the embedded flock length used for a screen-printed latex.

34. The method of claim 32, wherein the thermoplastic adhesive sheet is partially melted in the heating step (e).

35. The method of claim 32, wherein the thermoplastic adhesive sheet has upper and lower portions, wherein the upper portion is contacted with the substrate, wherein the lower portion is contacted with the flock and is positioned between the flock and upper portion, and wherein at least one of the melting point and viscosity of the upper portion is higher than the at least one of the melting point and viscosity of the lower portion.

36. The method of claim 35 wherein the upper portion has a higher melting point than the lower portion, and wherein each of steps (d) and (e) occurs after each steps (b) and (c).

37. The method of claim 30, further comprising:
before step (b), precutting the thermoplastic adhesive sheet to a desired final shape of the transfer.

38. The method of claim 30, wherein a first surface of the thermoplastic adhesive sheet in contact with the flock and a second opposing surface are each at least substantially free of a binder adhesive.

39. The method of claim 30, wherein the flock comprises a plurality of fibers substantially perpendicular to the release sheet, and wherein at least substantially all of the flock fibers that are substantially perpendicular to the release sheet contact the thermoplastic adhesive sheet.

40. The method of claim 30, wherein the pressure applied to the flocked release sheet and thermoplastic adhesive sheet ranges from about 40 to about 50 psi.

41. The method of claim 30, wherein the transfer is free of a powdered hot melt adhesive.

42. A method of producing a flocked transfer assembly, comprising:
providing a release agent on the release sheet;
flocking a plurality of flock fibers on the release agent in a desired pattern to form a flocked release sheet, having a free surface of the flock, wherein the release agent holds the flock to the release sheet, and wherein the flock fibers are substantially perpendicular to the upper and lower surfaces and to the release sheet;
providing a pre-formed, solid and self-supporting thermoplastic adhesive sheet;
contacting the free surface of the flock with the thermoplastic adhesive sheet such that at least most of a free surface of the flock is in direct physical contact with the thermoplastic adhesive sheet;
heating and applying pressure to the flocked release sheet and thermoplastic adhesive sheet to render the thermoplastic adhesive tacky and embed at least most of the flock fibers in the thermoplastic adhesive, thereby adhering the thermoplastic adhesive sheet to the free surface of the flock to produce a flocked transfer assembly; and
subsequently adhering the flocked transfer assembly to a substrate.

43. The method of claim 42, wherein the pressure applied to the flocked release and thermoplastic adhesive sheets ranges from about 40 to about 50 psi.

44. The method of claim 42, wherein the flocked transfer assembly is free of a powdered hot melt adhesive.

45. A method of producing an article of manufacture having a flocked surface, comprising:
supplying a flocked surface comprising flock;
supplying a pre-formed solid, and self-supporting thermoplastic adhesive sheet having a substantially uniform thickness and substantially flat upper and lower surfaces;
thereafter contacting the thermoplastic adhesive sheet with the flock; and
while the flocked surface is in contact with the thermoplastic adhesive sheet, heating and applying pressure to the thermoplastic adhesive sheet to soften the adhesive and embed at least most of the flock fibers in the thermoplastic adhesive, thereby binding the thermoplastic adhesive sheet to the flock of the flocked surface.

46. The method of claim 45, wherein the flocked surface comprises a release sheet and a release agent in contact with a first side of the flocked surface, and wherein the thermoplastic adhesive sheet is in contact with an opposing second side of the flocked surface.

* * * * *